July 18, 1933.    T. J. McCORMICK    1,918,549
TIRE COVER
Original Filed Oct. 21, 1930
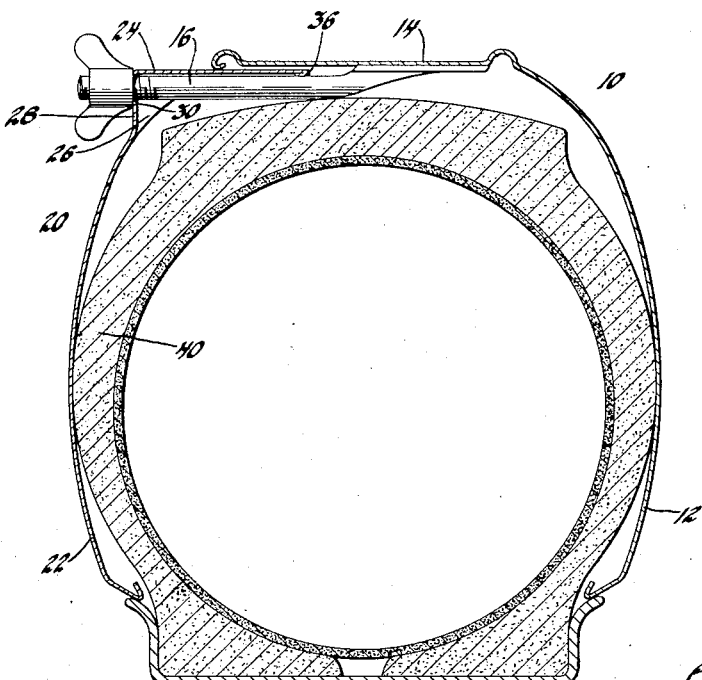
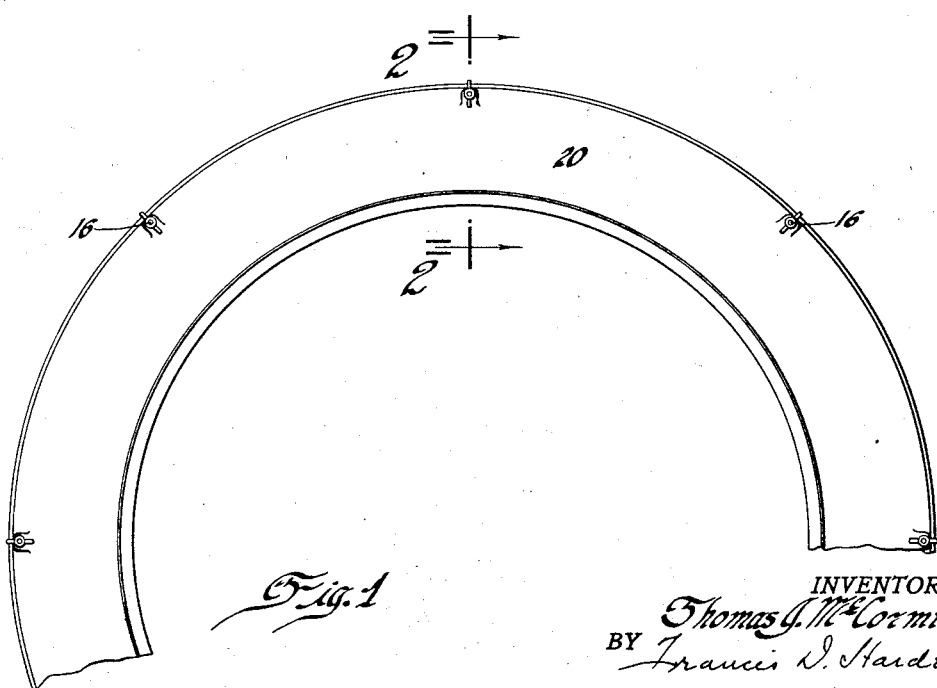
INVENTOR
Thomas J. McCormick
BY Francis D. Hardesty
ATTORNEY Patented July 18, 1933

1,918,549

UNITED STATES PATENT OFFICE

THOMAS J. McCORMICK, OF DETROIT, MICHIGAN

TIRE COVER

Application filed October 21, 1930, Serial No. 490,193. Renewed October 21, 1932.

This invention relates to tire covers and more particularly to covers made of metal which is adapted to be polished, plated or otherwise ornamented if desired.

An object of this invention is a tire cover including a receptacle portion and a cover portion secured thereto by bolts, the cover portion being telescoped within the receptacle portion and the bolts being secured to the interior of the receptacle on a line below the lower edge of the cover portion.

Further, if desired, spacing bosses corresponding in number to the number of bolts used, may be provided on the cover, the bosses having flat surfaces forming seats for the nuts used with the bolts.

Further objects will readily occur to those skilled in the art upon reference to the following description and the following description of the accompanying drawing in which Fig. 1 is an elevation view of the cover.

Fig. 2 is a section as if on the line 2—2 of Fig. 1.

As indicated on the drawing, the top cover includes a receptacle portion 10 having a circular wall 12 and an annular wall 14. Disposed within the receptacle portion and secured to the wall 14 by welding, riveting or the like, are bolts 16, these last having flattened portions at their ends to facilitate the securing of the bolts to the wall 14. Telescoped to the receptacle portion is a portion 20 having a circular portion 22 and an annular wall 24, which latter being slightly smaller in diameter than the annular wall 14 of the receptacle 10. The cover 20 is provided with a number of spaced bosses 26 each of which is provided with a flat seat 28 having a perforation 30 therein thru which the bolts 16 are adapted to project. Nuts are threaded on the free ends of the bolts after the cover is telescoped into the receptacle and the lower surface of the nut rests upon the flat nut seats 28 of the bosses 26.

A feature of the invention is the proper dimensioning of the receptacle and the cover. As shown the annular wall of the cover is so narrow that when the cover is telescoped into the receptacle, the lower edge 36 of the cover is disposed a substantial distance above the bolts, whereby the lower edge does not strike the bolts, thus eliminating the marring of the cover by the bolts, the dislodgement of the bolts from the receptacle and the loosening of the cover when it is applied to a tire such as the one shown at 40.

It will be observed that there has been provided a complete tire cover including only a receptacle portion, a cover portion and means for securing them both in mutually telescoped relation.

Now having described the invention and the preferred embodiment thereof, it is to be understood that the said invention is to be limited, not to the specific details herein set forth, but only by the scope of the claims which follow:

1. A tire cover including a receptacle having a circular base and an outer wall, and a cover telescoping thereon and having a circular top and an annular outer wall disposed within the outer wall of the receptacle, said receptacle having interiorly disposed bolts secured to the inside of said outer wall and projecting thru the circular top of the cover.

2. A tire cover including a receptacle having a circular base and an outer wall, and a cover telescoping thereon and having a circular top and an annular outer wall disposed within the outer wall of the receptacle, said receptacle having interiorly disposed bolts secured to the inside of said outer wall and projecting thru the circular top of the cover, the free edge of the annular wall of said cover being spaced from the points at which the bolts are secured to the receptacle wall when the cover is in its final covering position.

3. A tire cover including a receptacle having a circular base and an outer wall, and a cover telescoping thereon and having a circular top and an annular outer wall disposed within the outer wall of the receptacle, said receptacle having interiorly disposed bolts, secured to the inside of said outer wall and projecting thru the circular top of the cover, the free edge of the annular wall of said cover being spaced from the points at which the bolts are secured to the receptacle wall when the cover is in its final covering position, the circular top of the cover being provided with raised portions thru which project the bolts and which form seats for nuts threaded on said bolts.

4. A cover for motor vehicle tires including a plurality of annular sections adapted to be fitted together around said tire, and conforming to the shape of the tire, elongated members whose inner ends are attached to the inside of one section and whose free ends are fitted through bearings in the other section, and means on said free ends for retaining said sections in assembled relation.

5. In a tire cover, a front section including a face portion and a semi-tread portion, and a rear section including a semi-tread portion, the semi-tread portions of the sections being relatively telescoped to form a complete tire cover with an edge part of the front section overlapping an edge part of the rear section, and means for maintaining the sections in assembly, said means being peripherally spaced and including parts relatively adjustable in a direction parallel to the central axis of the cover, the means being disposed at least partially inside of and secured to the semi-tread portion of the front section, and engaging behind the rear surface of the semi-tread portion of the rear section, the means extending across the semi-tread portion of the rear section.

THOMAS J. McCORMICK.